United States Patent
Brannan et al.

(10) Patent No.: US 11,562,301 B1
(45) Date of Patent: Jan. 24, 2023

(54) VEHICLE FLEET EXCHANGE METHOD AND SYSTEM

(71) Applicant: STATE FARM MUTUAL AUTOMOBILE INSURANCE COMPANY, Bloomington, IL (US)

(72) Inventors: Joseph Robert Brannan, Bloomington, IL (US); Ryan Gross, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 162 days.

(21) Appl. No.: 16/269,148

(22) Filed: Feb. 6, 2019

(51) Int. Cl.
*G06Q 10/02* (2012.01)
*G06Q 50/30* (2012.01)
*G06Q 10/10* (2012.01)
*G08G 1/00* (2006.01)

(52) U.S. Cl.
CPC ......... *G06Q 10/02* (2013.01); *G06Q 10/1093* (2013.01); *G06Q 50/30* (2013.01); *G08G 1/202* (2013.01)

(58) Field of Classification Search
CPC .................................................... G08G 1/202
See application file for complete search history.

(56) References Cited

U.S. PATENT DOCUMENTS

| | | | | |
|---|---|---|---|---|
| 8,612,273 B2 * | 12/2013 | Johnson | ............. | G06Q 10/0631 705/400 |
| 9,311,271 B2 | 4/2016 | Wright | | |
| 9,633,487 B2 | 4/2017 | Wright | | |
| 10,192,369 B2 | 1/2019 | Wright | | |
| 10,198,879 B2 | 2/2019 | Wright | | |
| 2016/0093216 A1 * | 3/2016 | Lee | ........................ | G08C 17/02 340/870.11 |

(Continued)

OTHER PUBLICATIONS

Y. Li, W. Li and C. Jiang, "A Survey of Virtual Machine System: Current Technology and Future Trends," 2010 Third International Symposium on Electronic Commerce and Security, Guangzhou, 2010, pp. 332-336, doi: 10.1109/ISECS.2010.80. (Year: 2010).*

(Continued)

*Primary Examiner* — Victoria E. Frunzi
*Assistant Examiner* — Robert Fredeking
(74) *Attorney, Agent, or Firm* — Marshall, Gerstein & Borun LLP (57) ABSTRACT

A method of facilitating a fleet exchange includes retrieving a fleet and retrieving a set of workers, analyzing the fleet and the set of workers using smart scheduling to generate allocations, and displaying the allocations to the workers. In another aspect, a non-transitory computer readable medium includes program instructions that when executed, cause a computer system to receive vehicle allocation request, retrieve worker information and a worker calendar, generate an allocation, and display the allocation in a display device. A computing system for facilitating fleet exchange includes one or more processors and a memory including computer executable instructions that, when executed by the one or more processors, cause the computing system to retrieve a fleet and a set of workers, analyze the fleet and the set of workers to generate allocations, and display the allocations in a respective computing device of the workers.

20 Claims, 5 Drawing Sheets

(56) References Cited

U.S. PATENT DOCUMENTS

2016/0342929 A1* 11/2016 Tanaka ............ G06Q 10/06314

OTHER PUBLICATIONS

Millard-Ball, Adam. Car-sharing: Where and how it succeeds. vol. 60. Transportation Research Board. (Year: 2005).*
Y. Li, W. Li and C. Jiang, "A Survey of Virtual Machine System: Current Technology and Future Trends," 2010 Third International Symposium on Electronic Commerce and Security, Guangzhou, 2010, pp. 332-336, doi: 10.1109/ISECS.2010.80., hereinafter "Li" (Year: 2010).*

* cited by examiner

VEHICLE FLEET EXCHANGE METHOD AND SYSTEM

FIELD OF THE DISCLOSURE

The present disclosure generally relates to a system and method of facilitating vehicle fleet exchange, and more particularly, to using smart scheduling and distributed applications to enhance resource utilization and worker productivity.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A company may have a fleet including two or more owned or leased company vehicles (equivalently, "automobiles," or "autos"), wherein the vehicles include any number of passenger vehicles, trucks, vans and/or other vehicles (e.g., motorcycles, buses, etc.). The vehicles may include autonomous and/or semi-autonomous features. Increasingly, telematics data related to the operation of motor vehicles of all types is captured by telematics systems that are built into vehicles, or which are carried into vehicles by drivers and passengers (e.g., mobile computing devices). Such telematics systems measure and capture data directly from vehicle computer systems as well as indirectly from the vehicle environment. In general, the company may loan, sell and/or lease the company vehicles to the company's workers (e.g., employees, contractors, etc.) for use in the performance of the company's business. For example, a sales company may provide vehicles for salespeople to use for sales calls during business hours and for personal use during non-business hours. In another example, a utility company may provide work trucks that are signed out by utility workers during the work day and returned to a vehicle depot at the conclusion of the day's business.

However, the company faces several problems with respect to the fleet of company vehicles. First, conventional techniques of providing company vehicles to workers are inefficient because providing each worker with a vehicle to use may require the company to purchase or lease as many vehicles as the company has employees. Second, whenever a company vehicle is not being driven by a worker, the vehicle is an idle resource that is not being used to the fullest extent. Third, providing a worker with a vehicle that the worker will only use when the worker is working is expensive.

BRIEF SUMMARY

In one aspect, a computer-implemented method of facilitating a fleet exchange includes retrieving a fleet including one or more autos via one or more processors, retrieving a set of workers each including a respective work calendar, a respective first location, and a respective second location. The method may further include analyzing the fleet and the set of workers using a fleet calendar module to generate a set of one or more auto allocations wherein each auto allocation in the set of auto allocations corresponds to a respective worker in the set of workers, and displaying, in a respective computing device of each worker in the set of workers, the auto allocation corresponding to the worker.

In another aspect, a non-transitory computer readable medium includes program instructions that when executed, cause a computer system to receive an input of a user the input including a request for a vehicle allocation via an input device, retrieve a worker information data set and a worker calendar via one or more processors, generate an auto allocation with respect to the user based on the worker information data set and the worker calendar, and display the auto allocation with respect to the user in a display device of a computer system.

In yet another aspect, a computing system for facilitating fleet exchange includes one or more processors and a memory including computer executable instructions that, when executed by the one or more processors, cause the computing system to retrieve a fleet including one or more autos via one or more processors, retrieve a set of workers each including a respective work calendar, a respective first location, and a respective second location, via one or more processors. The memory may include further instructions that, when executed, cause the computing system to analyze the fleet and the set of workers using a fleet calendar module to generate a set of one or more auto allocations wherein each auto allocation in the set of auto allocations corresponds to a respective worker in the set of workers, and display the auto allocation corresponding to the worker in a respective computing device of each worker in the set of workers.

DETAILED DESCRIPTION

Overview

The present techniques include methods and systems for facilitating a company vehicle fleet exchange, and more particularly, for providing computing devices for accepting, analyzing, and confirming company vehicle reservations using smart scheduling. A company may operate a remote computing device including a database of company vehicles in a company vehicle fleet. The company may operate a computing device including computer-executable instructions for receiving company vehicle requests from one or more company workers, wherein each request specifies one or more request parameters. The company may analyze the requests using smart scheduling to determine a schedule and allocation for each vehicle in the company vehicle fleet. The company may transmit confirmation responses to the company workers, wherein each confirmation response corresponds to a respective company vehicle request. In some embodiments, the company may base the smart scheduling and company vehicle allocation on internal needs of the company, such as appointments created by customers of the company.

The company may want to provide benefits to workers that are cost-effective. Providing transportation options to and from work may be an expensive option. Vehicles that are not in use have down-time and reduced utility when they are parked. Insuring company-owned vehicles for company workers may be expensive. In some cases, the company may want to provide vehicles to workers that are not take-home vehicles. Then, the company may operate a business-to-consumer car sharing platform (CSP) to allow the vehicles in the company's fleet to be used to capture economic inefficiencies while the vehicles are not in use by workers (e.g., at night and during the weekend). The company may use the methods and systems disclosed herein to overcome difficult scheduling problems created in a hybrid-use scenario, wherein vehicles are used by both workers and made available to the general public.

The methods and systems described herein may be used to allow workers who reside in suburbs and exurbs to commute to work. The smart scheduling techniques herein may include generating carpooling suggestions for workers based on analyzing the location of such workers. One benefit of carpooling and providing fleet vehicles to workers is increased efficiency and reduced cost. For example, wear and tear on the personal vehicle of workers due to stop-and-go and/or interstate driving is avoided by implementing the present techniques. Further, in some cases, workers may be able to dispose of their personal vehicles.

The present techniques may include receiving vehicle telematics data from a telematics system integral to the company vehicle and/or data generated by a mobile device of the worker. In general, the "worker" may be driver/operator or passenger of a vehicle of the company. The telematics data may include a data set reflecting a plurality of features, readings, and/or statuses of the vehicle. For example, the telematics data may include driving events (e.g., engagement of a cruise control system, gas tank refueling, a braking event, location, etc.) that are directly measureable by analyzing telematics data. Telematics data may also include information regarding the environment of the vehicle, such as humidity, temperature, etc. Telematics data may include the mileage of the vehicle, the levels of any fluids in the vehicle (e.g., windshield wiper fluid, oil fluid, brake fluid, etc.), tire pressure, etc. that is ascertainable by a telematics system of the vehicle using the onboard sensors and computers of the vehicle. User data may include information provided by the user to a computer, such as by way of an electronic form, web site, mobile application or other computerized mechanism for entering information. For example, user data may include photographs, textual descriptions, selections of a user from a pre-programmed menu (e.g., a value of a slider widget, a Boolean entry, etc.). The present techniques may include processing the telematics data and/or the user data using computer executable instructions.

Example Computing Environment

Figure 1:
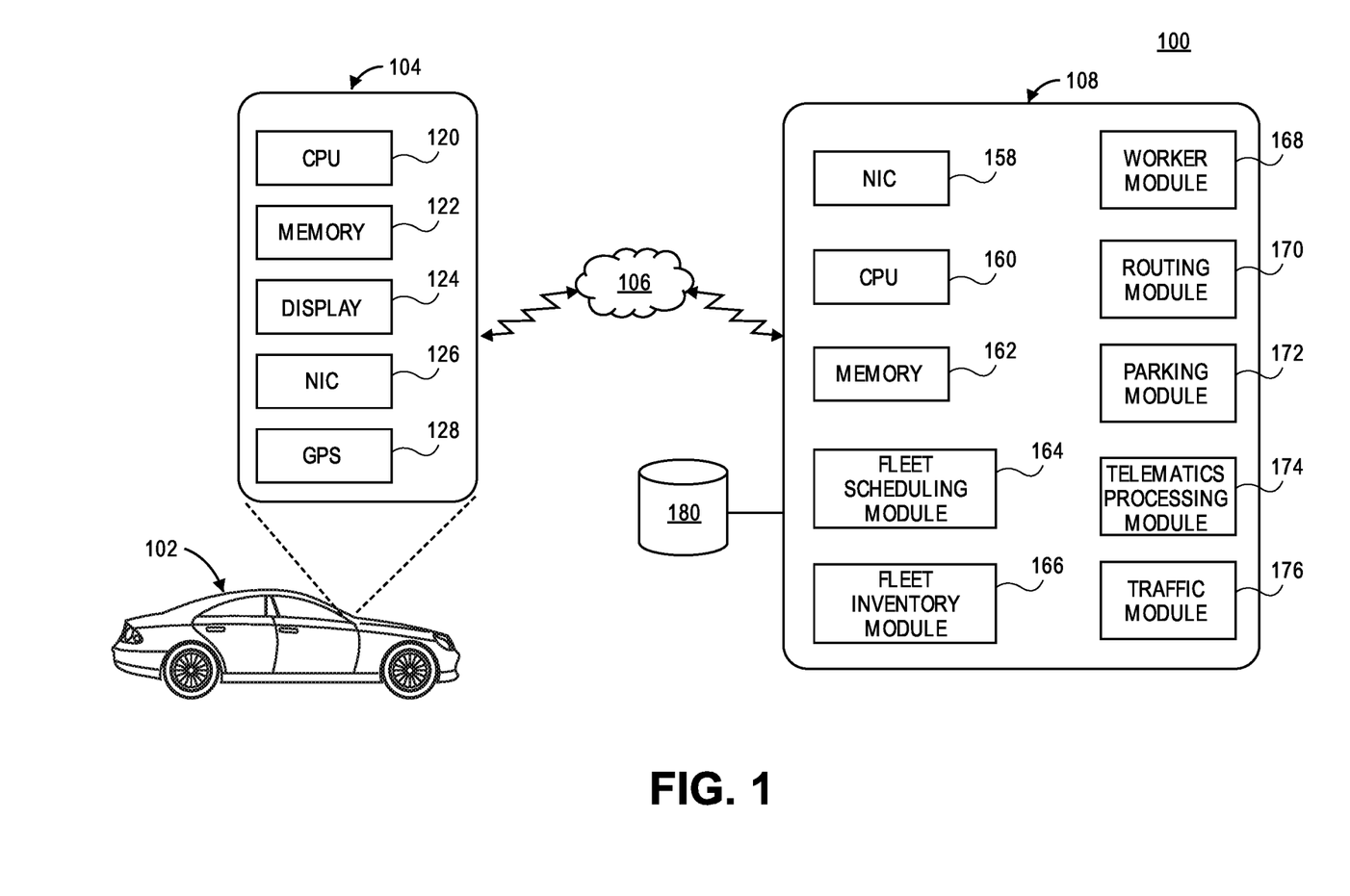
FIG. 1 depicts an example computing environment for implementing a company vehicle fleet exchange method and system, according to an embodiment.

FIG. 1 depicts an example computing environment 100 for implementing a company vehicle fleet exchange method and system for implementing, inter alia, smart scheduling and allocation of company vehicles. The environment 100 may include a vehicle 102 associated with a telematics system 104, a network 106, and a server 108.

The vehicle 102 and the telematics system 104 are remote from the server 108 and are coupled to the server 108 via the network 106. The network 106 may include any suitable combination of wired and/or wireless communication networks, such as one or more local area networks (LANs), metropolitan area networks (MANs), and/or wide area networks (WANs). As just one specific example, the network 106 may include a cellular network, the Internet, and a server-side LAN. As another example, the network 106 may support a cellular (e.g., 4G, 5G, etc.) connection to a mobile computing device of a user and an IEEE 802.11 connection to the mobile computing device. While referred to herein as a "server," the server 108 may, in some implementations, include multiple servers and/or other computing devices. Moreover, the server 108 may include multiple servers and/or other computing devices distributed over a large geographic area (e.g., including devices at one or more data centers), and any of the operations, computations, etc., described below may be performed in by remote computing devices in a distributed manner.

The telematics system 104 may include hardware and software components implemented in one or more devices permanently and/or temporarily affixed to, or otherwise carried on or within, the vehicle 102. For example, some or all of the components of the telematics system 104 may be built into the dash of the vehicle 102 or affixed elsewhere within the vehicle 102 (e.g., via an onboard diagnostics port of the vehicle 102). In an embodiment, a portion of the telematics system 104 may be implemented using a mobile computing device (e.g., a smart phone of the user). In some embodiments, multiple instances of the telematics system 104 may include a first telematics system 104 of a first user implemented as a smart phone and a second telematics system 104 of a second user implemented as a smart phone.

The telematics system 104 may include specialized hardware (e.g., one or more sensors) and computer-executable instructions for retrieving/receiving vehicle telematics data from the vehicle 102. In some cases, the telematics system 104 may be implemented using components of the vehicle 102 and a mobile computing device. For example, a vehicle telematics generation module may be included in the vehicle 102 and a vehicle telematics collection module may be included in a mobile computing device of the user, wherein the vehicle telematics collection module receives and/or retrieves a telematics data set from the vehicle telematics generation module. In some embodiments, some or all of the telematics system 104 may be provided by the company. For example, the company may own the vehicle 102, the telematics system 104, and/or the server 108.

In an embodiment, a first telematics system in the vehicle 102 may collect data and transmit the data to the server 108, while a second telematics system in the mobile computing device of the user may display information relating to. For example, the first user may be a worker of the company, and the second user may be another worker of the company. Both the first and second user may have a smart phone, corresponding to a first and second telematics system 104, respectively. While FIG. 1 depicts only a single vehicle 102, the vehicle 102 may be in communication with numerous other servers similar to the server 108 via the network 106 and/or other networks. The telematics system 104 may include a processor 120, a memory 122, a display 124, a network interface 126, and a global positioning system (GPS) unit 128. The processor 120 may be a single processor (e.g., a central processing unit (CPU)), or may include a set of processors (e.g., a CPU and a graphics processing unit (GPU)). The telematics system 104 may further include one or more sensor and an electronic database (not depicted).

The memory 122 may be a computer-readable, non-transitory storage unit or device, or collection of units/devices, that includes persistent (e.g., hard disk) and/or non-persistent memory components. The memory 122 may store instructions that are executable on the processor 120 to perform various operations, including the instructions of various software applications and data generated and/or used by such applications. In the example implementation of FIG. 1, the memory 122 may store instructions that when executed by the processor 120 facilitate the bidirectional transmission of telematics data between the telematics system 104 and the server 108 (e.g., sending telematics data collected from the vehicle 102 to the server 108, receiving requests and responses relating to telematics data from the server 108, receiving/retrieving telematics and/or user data to generate and display ride share offer messages to the user to facilitate the user's performance of actions relating to the vehicle, etc.).

The display 124 includes hardware, firmware and/or software configured to enable a user to interact with (i.e., both provide inputs to and perceive outputs of) the telematics system 104. For example, the display 124 may include a touchscreen with both display and manual input capabilities. Alternatively, or in addition, the display 124 may include a keyboard for accepting user inputs, and/or a microphone (with associated processing components) that provides voice control/input capabilities to the user. In some embodiments, the telematics system 104 may include multiple different implementations of the display 124 (e.g., a first display 124 associated with the vehicle 102 and a second display 124 associated with a mobile computing device of the user).

The network interface 126 includes hardware, firmware and/or software configured to enable the telematics system 104 to wirelessly exchange electronic data with the server 108 via the network 106. For example, network interface 126 may include a cellular communication transceiver, a WiFi transceiver, and/or transceivers for one or more other wireless communication technologies (e.g., 4G).

The GPS unit 128 includes hardware, firmware and/or software configured to enable the telematics system 104 to self-locate using GPS technology (alone, or in combination with the services of server 108 and/or another server not shown in FIG. 1). Alternatively, or in addition, the telematics system 104 may include a unit configured to self-locate, or configured to cooperate with a remote server or other device(s) to self-locate, using other, non-GPS technologies (e.g., IP-based geo-location).

In some embodiments, software stored in the memory 122 provides functionality for collecting telematics data from the vehicle 102. If the telematics system 104 is a unit integrated in the vehicle (e.g., a head unit providing vehicle dashboard integrated navigation technology), for example, the telematics system 104 may include a hardwired connection (e.g., via a Controller Area Network (CAN) bus) to one or more other units of the vehicle 102. As another example, if the telematics system 104 is a smartphone (or smart watch, etc.), the telematics system 104 may couple to one or more units of the vehicle via a wired connection (e.g., an onboard diagnostics connection) or a wireless connection (e.g., Bluetooth, WiFi, etc.). Software stored in the memory 122 may provide functionality for processing telematics data from the vehicle 102. The processing may include retrieving/receiving data from one or more sensors communicatively coupled to the telematics system 104 (e.g., vehicle-based sensors).

The one or more sensors may include one or more sensors associated with the vehicle 102 (e.g., a speedometer sensor) and/or a mobile device of the user (e.g., an accelerometer in a smartphone). The sensor may provide data (e.g., sensor readings) to applications (e.g., an application executing in the memory 122). Many types of sensors may be used, such as cameras, video cameras, and/or microphones. In some embodiments, sensors may read the speedometer, engine warning lights (if any), oil pressure, wiper fluid level, oil temperature, emission readings, etc. Of course, some of the telematics data created by sensors may not be visible to/accessible by the vehicle operator. In embodiments wherein the telematics system 104 is implemented using a mobile computing device, the sensor may be a vehicle-based sensor accessed wirelessly by the telematics system 104.

The server 108 includes a network interface 158, a processor 160, a memory 162, a fleet scheduling module 164, a fleet inventory module 166, a worker module 168, a routing module 170, a parking module 172, a telematics processing module 174, a traffic module 176, and a database 180. The network interface 158 includes hardware, firmware and/or software configured to enable the server 108 to exchange electronic data with the telematics system 104 via network 106. For example, network interface 158 may include a wired or wireless router and a modem. The processor 160 may be a single processor (e.g., a central processing unit (CPU)), or may include a set of processors (e.g., a CPU and a graphics processing unit (GPU)).

The memory 162 is a computer-readable, non-transitory storage unit or device, or collection of such units/devices, that may include persistent (e.g., hard disk) and/or non-persistent memory components. The memory 162 may store data generated and/or used by other modules of the server 108 (e.g., the fleet scheduling module 164, the fleet inventory module 166, etc.).

The fleet scheduling module 164 may be comprised of computer executable instructions (e.g., software) and is generally configured to identify and coordinate workers, routes, and vehicles. For example, the fleet scheduling module 164 may determine which worker and/or CSP customer is allocated which vehicle(s), when the worker/CSP customer receives the vehicle, and where the vehicle will be parked/stored. The fleet scheduling module 164 may analyze information in the database 180 (e.g., worker profile information, vehicle information, worker schedule information, etc.). The fleet scheduling module 164 may match workers and vehicles for car pooling, using worker information from the worker module 168, routing information from the routing module 170, and/or parking availability information from the parking module 172.

The fleet inventory module 166 is generally configured to retrieve and/or receive information regarding the company's fleet of vehicles from the database 180. The fleet inventory module 166 may update the information in the database 180 and the information received/retrieved from the database 180 with real-time and/or updated information (e.g., vehicle status information received/retrieved from the telematics processing module 174).

The worker module 168 is generally configured to receive/retrieve worker information from the database 180. For example, the database 180 may include a personnel database wherein each worker of the company is listed, including the worker's demographic information (e.g., name, age, location, gender, address, etc.). The personnel database may further include, or be linked via a database relation, to information about the worker's role. For example, the personnel database may have a foreign key associating each worker with a role in a roles database. The roles database may include information about the worker's job type that may be used by other modules to determine the type of vehicle required for the performance of the worker's job functions. The worker module 168 may include instructions for retrieving and/or updating information in the personnel database and the roles database.

The routing module 170 is generally configured to analyze workers' locations and to determine paths from one worker's location to another worker's location. The routing module 170 may access mapping data and/or geographic information, such as a third-party street mapping application programming interface. The routing module 170 may provide turn-by-turn navigational directions, and may produce maps for display to workers. The routing module 170 may include instructions for determining the distance (e.g., in miles or kilometers) between two workers, and for finding the shortest path from one worker's location to the location of another worker.

The parking module 172 is generally configured to allocate parking spaces to vehicles and/or workers. The parking module 172 may include parking spot maps and parking garage data (e.g., entry/validation codes), spot ownership/lessee information, etc. The parking module 172 may include instructions for receiving and/or updating information in the database 180 regarding available parking spaces that the server 108 uses when allocating vehicles.

The telematics processing module 174 may include a set of computer-executable instructions for receiving, retrieving, processing, and/or analyzing vehicle telematics data. For example, the instructions may include routines for processing telematics data encoded in proprietary data formats and/or standardized data formats (e.g., the Association of Equipment Management Professionals standard). The telematics processing module 174 may store data converted from telematics data into a standardized data format in the database 180, allowing data in disparate formats to be uniformly queried by other components. Therefore, whereas two vehicle manufacturers may encode a telematics fact using a different data formatting strategy (e.g., vehicle speed may be encoded in miles-per-hour by a first manufacturer and kilometers-per-hour by a second manufacturer) to allow a module of the server 108 to directly compare vehicle speeds.

The traffic module 176 may include an application programming interface (API) or other computerized facility for retrieving real-time traffic data, predicted traffic data, and/or historical traffic data. For example, the traffic module 176 may accept a parameter corresponding to a geographic location (e.g., a place name, GPS coordinate, etc.) and may return traffic conditions corresponding to that geographic location. The traffic information may be encoded in a proprietary or standard mapping format (e.g., in an OpenStreetMap format). A module of the server 108 may overlay the traffic information received/retrieved from the traffic module 176 in a map displayed to a user (e.g., via the display 124). In some embodiments, the server 108 may communicate delays to CSP customers and/or to workers.

The database 180 may be any suitable database (e.g., a structured query language (SQL) database, a flat file database, a key/value data store, etc.). The database 180 may include a plurality of database tables for storing data according to data storage schema. The database 180 may include relational linkages between tables, and may allow complex data types such as time series data to be stored and queried. For example, the database 180 may be used to store smart schedules, objects representing vehicles, parking information, telematics data, etc. The database 180 may therefore include a reflection of the vehicle fleet and allocations of vehicles to workers over time, in addition to a historical reflection of vehicle fleets and allocations.

The database 180 may be configured to store a practically unlimited amount of information related to each company vehicle and worker. The database 180 may be queried to determine the status of each company vehicle, worker, schedule, etc. For example, the database 180 may include the work schedule and location of each worker, in addition to the location, make, model, type, etc. of each vehicle in the company's fleet. Although this disclosure describes a company having a fleet of vehicles, in some embodiments, one or more sublists of vehicles may be created in the database which may allow the environment 100 to more effectively organize one or more company vehicle fleets. Any of the modules of the server 108 may access the database 180 to create, read, update, and delete information.

The computer-implemented methods discussed herein may include additional, fewer, or alternate actions, including those discussed elsewhere herein. The methods may be implemented via one or more local or remote processors, transceivers, servers, and/or sensors (such as processors, transceivers, servers, and/or sensors mounted on drones, vehicles or mobile devices, or associated with smart infrastructure or remote servers), and/or via computer-executable instructions stored on non-transitory computer-readable media or medium.

In operation, each worker at the company may have a computing device that corresponds to the telematics system 104. For example, each worker may have a mobile computing device (e.g., a smart phone). Each computing device may include a reservation application, as described below. The reservation application may allow each worker to request a vehicle from the fleet. The server 108 may store a list of all vehicles in the fleet in the database 180. The server 108 may operate in multiple modes. In a first mode, the fleet scheduling module 164 may retrieve a list of registered workers from the database 180. For each employee, the fleet scheduling module 164 may retrieve the work schedule of each worker from the database 180. The fleet scheduling module 164 may apply a smart scheduling algorithm to each work schedule of each worker to determine an optimal vehicle allocation, wherein the smart scheduling algorithm is based on identifying (i) a location of each worker and (ii) a set of date and time needs of each worker. Rather than relying on manual scheduling, which may be ineffective due to changes in demand, the smart scheduling algorithm may be run periodically to adjust vehicle allocations to the company's workers. The fleet scheduling module 164 may retrieve information about the company's vehicles from the fleet inventory module 166. For example, while the database 180 may list the make and model of each vehicle, the fleet inventory module 166 may be used to determine the location of each vehicle in real-time and the current allocation.

In some cases, the smart scheduling algorithm may seek to allocate vehicles and/or carpooling routes to multiple users based on shift work schedules. For example the fleet scheduling module 164 may schedule a worker A on first shift to take a vehicle (e.g., the vehicle 102) from work to home and determine a parking spot T for the worker A to park the vehicle in by analyzing the worker's information using the parking module 172. The telematics module 104 of the vehicle 102 may update the location of the vehicle as being the spot T. The fleet scheduling module 164 may, based on the location of the vehicle 102 being at spot T, schedule a worker B who works third shift to pick up the vehicle at the spot T and to drive the vehicle until A's next shift starts. In some embodiments, rather than user B accessing the vehicle outside of user A's shift, the vehicle may be used by a CSP to provide service to car sharing customers until customer A goes back to work. By utilizing a shared vehicle in this way, that would otherwise be a quiescent vehicle, the company realizes additional income that the company would not ordinarily have, in addition to increasing the efficiency of resources. Further benefits that inure to the company include, without limitation, improved worker timeliness and attendance and employee satisfaction. Another benefit of the present techniques is accustoming workers and modernizing systems in preparation of a future scenario in which autonomous vehicles comprising an on-demand, continuously operating fleet are the norm. Some of the benefits of an autonomous vehicle fleet may be realized at an earlier time.

As used herein, an "allocation" is an association of a vehicle to one or more users for a respective purpose, for a respective time period. A vehicle may be subject to multiple allocations. For example, a passenger sedan may be allocated to two workers for a carpooling purpose, on two days per week. The passenger sedan may be allocated to a third worker for a sales call purpose on three other days per week. The fleet scheduling module 164 may include a method for automatically checking the allocation of a vehicle to determine conflicts such as overlaps in scheduling or duplicate allocations. In some embodiments, additional rules may be built into the allocation algorithm such that a particular worker gets a particular vehicle repeatedly. For example, given the choice between allocating one of a set of vehicles to a user, the algorithm would favor allocating a vehicle that the worker has driven previously. In other embodiments, no such preferential rules may be encoded.

The fleet scheduling module 164 may access the worker module 168 to retrieve a list of workers. For example, the fleet scheduling module 164 may retrieve one or more sets of workers from the worker module 168 based on one or more criteria. For example, a set of worker objects may be retrieved wherein each worker object corresponds to a worker at a company. Each worker may have the same primary job function (e.g., electrician) wherein all of the workers in the set are located within a geographic radius (e.g., 10 miles). The scheduling module 164 may then access the routing module 170 to further analyze the location of the workers in the set. The routing module 170 may include instructions for generating a shortest path, and for identifying a first worker and a last worker. The information generated by the routing module 170 may be used to generate a car-pooling schedule corresponding to the set of workers.

Once the routing module 170 identifies the first worker, the scheduling module 164 may access the parking module 172 to determine a pick-up location and drop-off location for the vehicle. The parking module 172 may determine a pick-up location and drop-off location based on one or more of (i) the worker's first location (e.g., home address), (ii) the worker's second location (e.g., work address), (iii) the location of a car sharing facility, and/or (iv) a supply and demand associated with a geographic location. The first worker may be instructed to retrieve the vehicle from the pick-up location and to drop off the vehicle at the drop-off location. In some cases, the drop-off location may be a parking garage or private parking spot owned/leased by the company that is within proximity to the worker's home or other address. In some embodiments, the company may provide first mile/last mile transportation for the worker from the pick-up/drop-off location to another location.

As noted above, the fleet inventory module 166 may determine the real-time position of every vehicle in the fleet by analyzing telematics data received by the telematics processing module 174 from the telematics system 104 via the network 106. The telematics processing module 174 may receive realtime information relating to the vehicle 102 operated by workers and other operators of the company's vehicles (e.g., car sharing customers).

The scheduling module 164 may receive/retrieve traffic information including realtime and historic traffic from the traffic module 176, and may use the traffic information in smart scheduling applications. For example, the fleet scheduling module 164 may determine an initial carpooling order of a set of employees A, B, and C as B→C→A based solely on information from the worker module 168 and the routing module 170. However, upon analyzing information from the traffic module suggesting that morning traffic is heaviest on the road from C→A, the scheduling module 164 may adjust the carpool order from C→A→B.

It another example, the fleet scheduling module 164 may be used to schedule vehicle allocations for hybrid use along with a CSP. For example, the scheduling module 164 may include a second smart scheduling algorithm that determines where and when certain types of vehicles are needed to server CSP customers and which allocates vehicles accordingly. In yet another example, the fleet scheduling module 164 may be used to schedule vehicle allocations for workday use only. For example, the scheduling module 164 may include a third smart scheduling algorithm for scheduling vehicles of a particular type (e.g., work trucks) for a particular purpose (e.g., dispatch calls) based on other information received on an ad-hoc basis, such as service calls from customers.

In a second mode, the fleet scheduling module 164 may be operated in conjunction with one or more interactive user interfaces for scheduling and confirming vehicle allocations. In the first mode, the scheduling module 164 may act in a headless or fully automated way wherein the scheduling module 164 allocates at a periodic interval without human intervention. In some other modes, human intervention via interactive user interfaces may be used to enhance some aspects of the operation of the scheduling module 164.

Example Graphical Interactive User Interfaces

Figure 2:
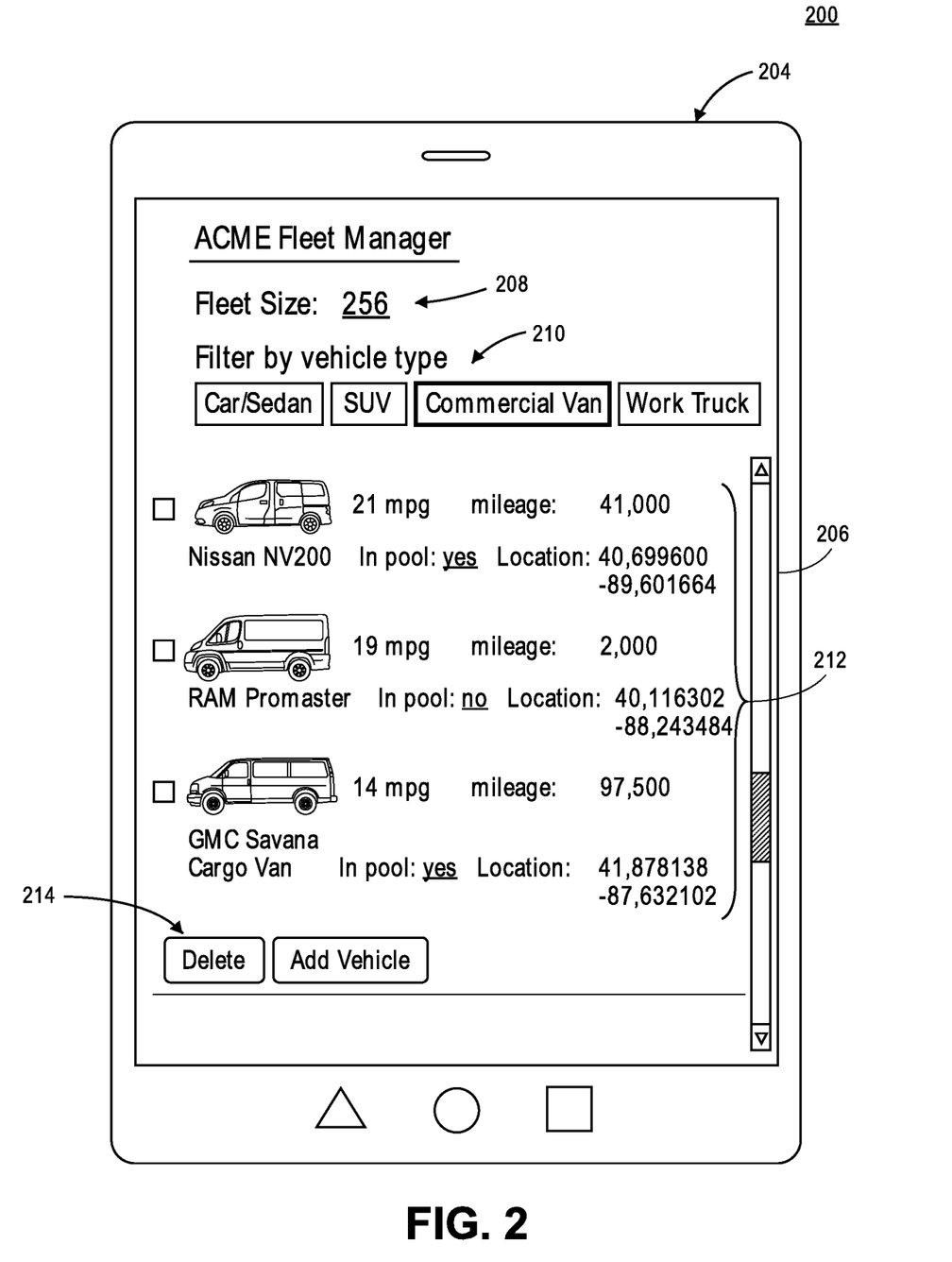
FIG. 2 depicts an example computing environment including a computing device for implementing a company vehicle fleet exchange method and system, according to an embodiment.

FIG. 2 depicts a computing environment 200 for implementing a system and method of managing a fleet of company vehicles. Environment 200 includes a device 204 that may correspond to the telematics system 104. The device 204 includes a screen 206 which may correspond to the display 124. The screen 206 may be capable of receiving touch inputs of the user (e.g., a capacitive touch screen). The screen 206 may include a fleet management application including a fleet size 208, filtering capabilities 210, filter output results 212, and management buttons 214. The fleet management application may be stored in a memory such as the memory 162, and a user may interact with the fleet management application via the device 204 to view the fleet using the fleet management application, add vehicles to the fleet, remove vehicles from the fleet, and update existing vehicle information in the fleet. In the depicted example, a user uses the filtering capabilities 210 to cause vehicles of a particular type (e.g., commercial vans) to be displayed in the filter output results 212. It should be appreciated that other filters are supported. Each vehicle displayed in the filter output results 212 includes an image of the vehicle, the vehicle make and model, capabilities (e.g., miles per gallon rating), current mileage, GPS location, and indication of whether the vehicle is part of the fleet/pool. Users may use the fleet management application to reserve one of the vehicles displayed in the filter output results 212.

Figure 3:
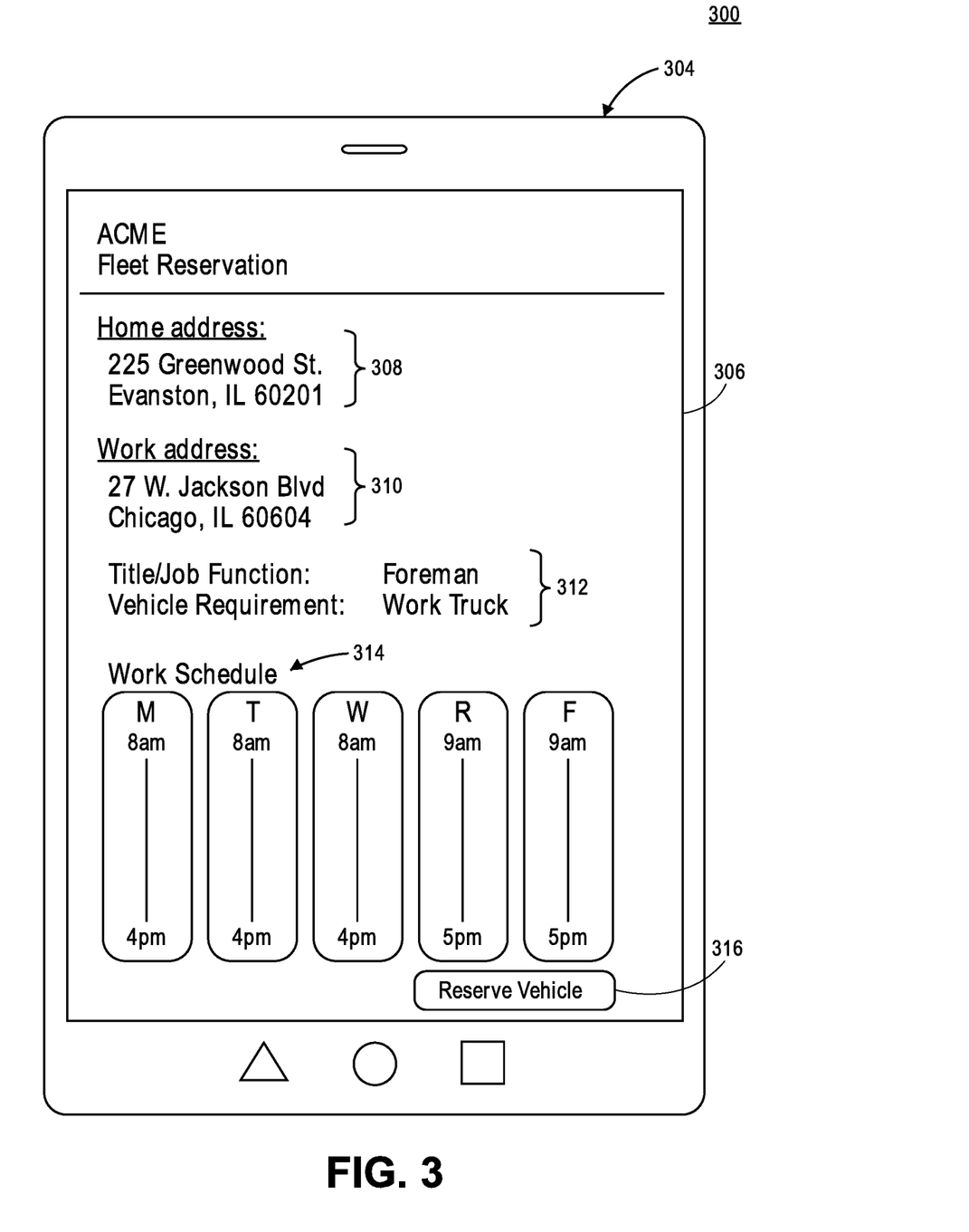
FIG. 3 depicts an example computing environment including a computing device for implementing a company vehicle fleet reservation and scheduling user interface, according to an embodiment.

FIG. 3 depicts a computing environment 300 for implementing reservations and smart scheduling on behalf of workers in relation to a fleet of company vehicles. Environment 300 includes a computing device 304 that may correspond to the telematics system 104. The device 304 includes a screen 306. The device 304 may include instructions for rendering the screen and graphical user elements therein, including a reservation application. The reservation application may include a first location 308 and second location 310. In some embodiments, the first location 308 may correspond to the home address of a worker at the company. In some embodiments the second location 310 may correspond to the work address of a worker at the company. Multiple workers at the company may use a respective device 304 to authenticate using a worker identification number, and to enter a first location 308 and a second location 310. Each worker may be associated with worker metadata 312, which the device 304 may retrieve from a remote computing device (e.g., the server 108) based on the worker identification number. The worker metadata 312 may include a worker job function and vehicle type required that is based on the worker job function. For example, a salesperson may be associated with a passenger vehicle requirement.

The device 304 may display the worker metadata in the screen 306. The device 304 may retrieve a work schedule 314 corresponding to each worker. The work schedule may be displayed in the screen 306. Once the worker enters a first location 308, the device 304 may automatically complete the information in the second location 310, the worker metadata 312, and the work schedule 314. The worker may review the information to ensure that it is correct and the select a reserve vehicle button 316. Once the user select the reserve vehicle button 316, the information displayed in the screen 306 may be submitted to a remote computing device (e.g., the server 108) via an HTTP POST request. In some embodiments, the worker may receive a vehicle confirmation reservation. In some embodiments the work schedule 314 may be adjustable. For example, the user may need a vehicle for a longer or shorter time than the work schedule 314 includes. The screen 306 may include user interface elements for adjusting the work schedule of each day (e.g., a slider that changes the daily reservation time of a respective day in the work schedule 314 in 15-minute increment). In some embodiments, a vehicle schedule (not depicted) may be displayed that corresponds to a sub portion of each day's work schedule in the work schedule 314. For example, regarding the depicted example, a second line may be displayed that shows a vehicle schedule on Monday from 7:30 am-4:30 pm. The 30-minute window before and after the work schedule of the worker may account for a commute time that is determined by a remote computing device based on the first location 308 of the worker.

Figure 4:
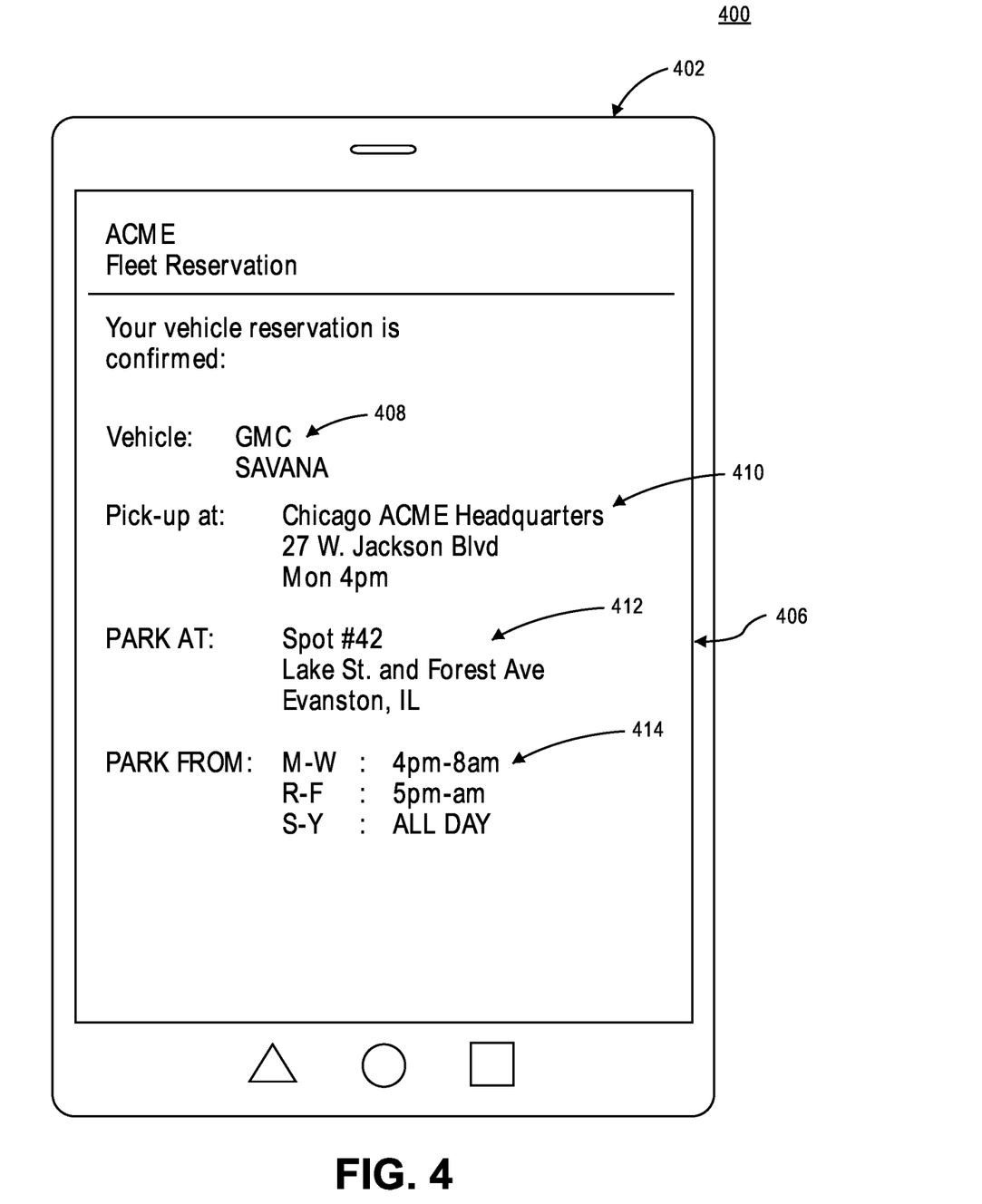
FIG. 4 depicts an example computing environment including a computing device for implementing a company vehicle fleet reservation confirmation user interface, according to an embodiment.

FIG. 4 depicts a computing environment 400 for implement reservation confirmations. Environment 400 includes a computing device 402 that may correspond to the telematics system 104. The device 402 includes a screen 406. The screen 406 may be a capacitive touch screen, and the device 402 may include instructions for accepting user inputs (e.g., touch events) and for displaying information in the screen 406. The screen 406 may include a vehicle reservation displayed in response to the user's submission of a reservation request as discussed with respect to FIG. 3. The confirmation information may be displayed in an application executing in the device 402 and may include a vehicle make and model 408, a pick up location 410, a parking location 412, and a parking schedule 414. Each of the pick up location 410, the parking location 412, and the parking schedule 414 may be determined by the fleet scheduling module 164 using the smart scheduling methods discussed above.

Example Method

Figure 5:
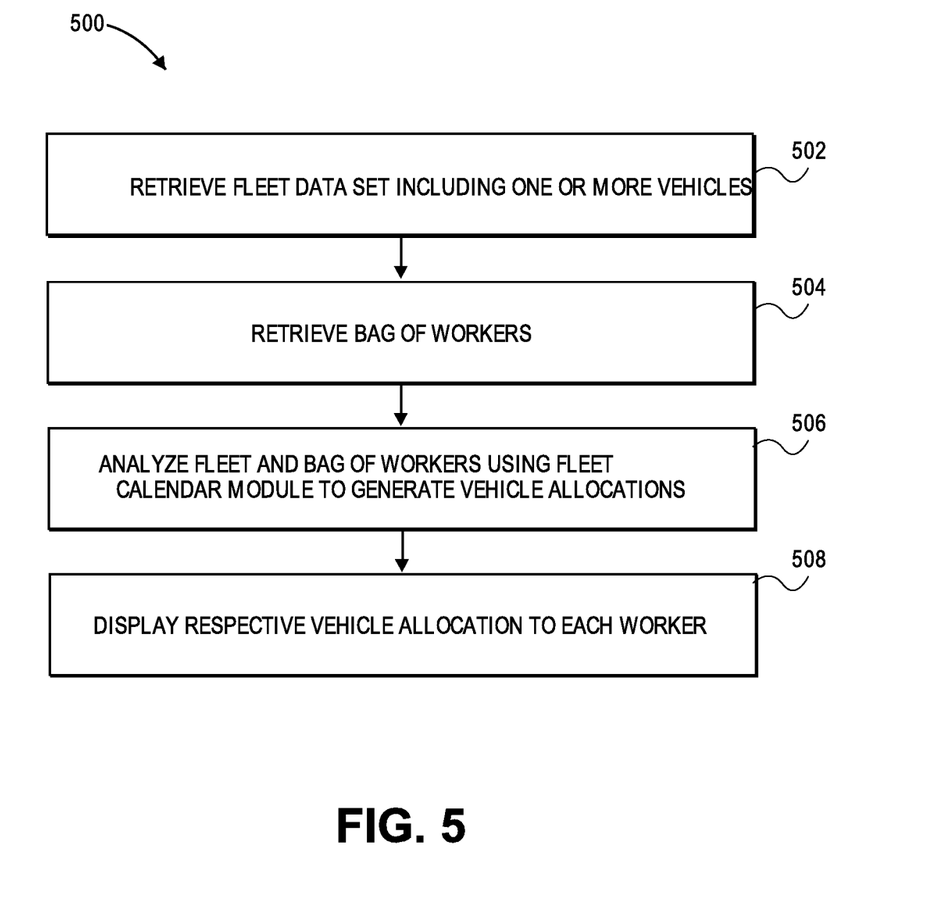
FIG. 5 depicts an example method for facilitating a company vehicle fleet exchange, according to one embodiment and scenario.

FIG. 5 depicts an example method 500 of implementing automated fleet exchange for a company vehicle fleet. The method 500 may include retrieving a fleet data set including one or more vehicles (block 502). The retrieved fleet may be a data structure/data set (e.g., a list, a hash table, a tree, or other suitable data structure) encapsulating one or more individual vehicle records. Each of the one or more individual vehicle records may be an electronic object or hash table having a plurality of keys wherein each of the keys is associated with a value. Each value may be an electronic object or hash table, such that each individual vehicle record may be a nested data structure. The keys may correspond to vehicle attributes (e.g., make, model, mileage, GPS location, etc.) and the respective values may hold the values of those vehicle attributes (e.g., Jeep, Wrangler, 10,000; 36° 10'09.3"N 115° 08'26.6"W, etc.). The method 500 may include updating the one or more individual vehicle records to include telematics data received from the telematics system 104, in some embodiments. The method 500 may receive and/or retrieve the fleet data set from the database 180, and the fleet inventory module 166 may augment the received/retrieved fleet data, in some embodiments. For example, the fleet inventory module may annotate each record in the fleet data set using information received from the fleet inventory module 166.

The method 500 may include retrieving a set of workers each including a respective work calendar, a respective first location, and a respective second location (block 504). As discussed above with respect to FIG. 3, the first location and second location may correspond respectively to the first location 308 and the first location 310. In some embodiments, the first location and second location may be entered into a device such as the device 304 and transmitted by the device 304 via the network 106 to the server 108, where the server 108 associates the first and second location with a worker record (e.g., a worker electronic object stored in the database 180). Therefore, the method 500 may include retrieving information relating to workers including their home and work addresses. As noted, in other embodiments, the method 500 may retrieve information relating to workers for intra-workday transportation, such that the first location and the second location correspond to a single location (e.g., a vehicle depot) or two different locations that correspond to a work location and a customer location (e.g., a service address of a customer).

The set of workers may be a data structure designed to hold one or more worker electronic objects (e.g., a set or multi-set). Each respective work calendar may be an electronic object representing calendar. For example, a nested list, a hash table, a matrix, and/or an object-oriented class/object may be used to implement the respective work calendar.

The method 500 may include analyzing the fleet and the set of workers using a fleet calendar module to generate a set of one or more vehicle allocations wherein each vehicle allocation in the set of vehicle allocations corresponds to a respective worker in the set of workers (block 506). For example, continuing the example above, the work calendar object may support attributes and methods designed to allow the fleet scheduling module 164 to query the object for information. For example, a getShifts( ) method may return a list of shifts of time during which the worker is scheduled. The shifts may be expressed absolutely (e.g., 08:00-16:00) or relatively (e.g., FIRST_SHIFT). The smart scheduling algorithm of the fleet scheduling module 164 may use such information to compare workers to determine which workers are working during a common time of day, and to allocate vehicles to workers and/or CSP customers. The allocation to a particular worker may be based on the geographic location of the vehicle, the type of vehicle, fuel efficiency of the vehicle, the mileage of the vehicle, etc. For example, the method 500 may include a rules engine whereby all vehicles of a given type (e.g., work trucks) are selected, and then the set of work trucks is further narrowed according to a weighting of geographic proximity to the worker, age of the vehicle, fuel efficiency, and mileage. The weights may be pre-determined constants that are derived using a machine learning model, in some embodiments. In the event of a tie (e.g., two or more selected vehicles) the scheduling module 164 may allocate a single vehicle to a worker at random.

As discussed above, in particular with respect to FIG. 3, the allocation process may occur periodically in a first automatic mode, or a second mode wherein the allocation is in response to a worker/customer request. Once the server 108 allocates a vehicle to the worker, the server 108 may transmit a confirmation of the vehicle allocation to the user, as discussed with respect to FIG. 4.

The method 500 may include displaying the vehicle allocation in a mobile computing device of the user. As noted, each worker at a company may have a device such as the device 402 (e.g., the telematics system 104). Therefore, the method 500 may include transmitting an allocation to two or more workers and displaying the allocations in the respective device of each worker, simultaneously or at different times. As noted with respect to FIG. 4, the display of the vehicle allocation may include a vehicle identification (e.g., a vehicle make, a vehicle model, a license plate, etc.), a pick up location (e.g., an address, a time, etc.), a parking location (e.g., a parking space identifier, an address, etc.), and a parking schedule denoting when the worker is to park the vehicle at the parking space. The application executing in the device 402 may, in some instances, display reminders to the worker related to the vehicle, such as a parking reminder one hour before the vehicle is due at the parking space.

Software as a Service and/or Packaged Software Platform Embodiment

It should be appreciated that the system 100 may be used in different contexts to perform the techniques described herein. For example, as discussed above, the company may use the fleet exchange methods and systems to manage the fleet of vehicles for its workers. In another embodiment, the company may sell the fleet management system as a packaged instance (e.g., a virtual machine) that a customer may purchase and run in a cloud computing infrastructure (e.g., Amazon Web Services) to manage the customer's fleet of vehicles. In that case, the customer would use the fleet management user interface of FIG. 2 to add the vehicles in the customer's fleet, and the other modes would function as described above, with respect to the customer's fleet of vehicles. Many such virtual instances may be sold and managed by customers to manage their respective fleets of vehicles. In some embodiments, the virtual machine instances may be managed by the company, as a software as a service (SaaS) product. In yet other embodiments, the system 100 may be packaged and sold to be executed in a dedicated hardware environment owned and controlled by the customer . . . .

Example Mobile Application

In general, the techniques herein (e.g., the method 500) may be implemented using a combination of one or more clients and/or one or more server devices. For example, depending on the hardware and software implementation chosen by an implementer, the method 500 may be entirely implemented using a single computing device (e.g., the telematics system 104). Increasingly, software developers are using user interface frameworks to build applications that allow application data, structure, state, behavior, and styling to be independently designed and managed. React.js and Angular are two popular application platforms for creating mobile applications, for example.

The user interface framework may be entirely contained within a module of the telematics system 104 of FIG. 1. For example, the user interface framework may be included in a mobile application (e.g., Android or iPhone application) downloadable from an application store which is stored in the memory 122 and is executed by the processor 120. In some embodiments, the user interface framework may generate a mobile application that is deployed in the telematics system 104. The user interface framework may associate the structure of one or more user interfaces with respective behavior, styling, state, and data bindings.

The user interface framework may define a structure, or a "shell" of one or more user interfaces. For example, the user interface framework may define separate structure for the user interfaces displayed in the respective screens (e.g., screen 204 and screen 306, for example).

In a first example of the user interface framework defining user interface structure, the screen 206 of FIG. 2 may be implemented using the user interface framework. The structure of the screen 206 may include the map view and origins and destination points comprising FIG. 2, lacking the vehicle images, miles per gallon readings, locations, etc. in the filter output results 212.

In a second example of the user interface framework defining user interface structure, the screen 306 of FIG. 3 may be implemented using the user interface framework to have its own structure that differs from the structure of the screen 206, such as a container for the first location 308, the second location 310, and the work schedule 314. For example, the screen 306 may be denoted in terms of columns and/or rows having a width and/or height denoted in relative terms (e.g., percentages of total screen width). In other embodiments, the regions/divisions may be denoted in terms of absolute values (e.g., pixels, points, ems, etc.). The regions may be associated with respective styling, state, and behavior that are independently configurable via the user interface framework.

As noted, the structure of the respective user interfaces defined by the user interface framework may include a series of heterogeneous components that are simple or complex structures (e.g., buttons, notification overlays, typographical structures, mapping elements, a row of components, a column of components, etc.). These components may be nested. The user interface framework may include data bindings, wherein the user interface framework automatically inserts data into the individual components included in the structure of a user interface. The inserted data may be received/retrieved from a local or remote source (e.g., the server 108) and may be added to the existing structure of a user interface. The mobile application may include instructions for receiving/displaying the data at particular times, and/or in response to the presence of certain conditions. For example, data may be received in real-time, periodically, once when the mobile application is first accessed by the user, etc. In other embodiments, the user interface framework may update the value of regions (e.g., the work schedule 314) in response to a user action (e.g., a touch input to the display 124) or a vehicle-based condition (e.g., the telematics processing module detecting a location of the vehicle 102) or the receipt of information by a component (e.g., the receipt of a reservation request by the server 108).

Components may include an identifier that allows them to be bound, styled, and unambiguously referenced by the user interface framework. For example, a simple example of a data binding is the "21 mpg" associated with the first vehicle in the filter output results 212. The number "21" may be associated with an mpg-id="vehicle[0].mpg". The data binding may include interpolating the number into a string, such as "vehicle-mpg={mpg-id} mpg" that when executed by the data binding element of the user interface framework causes the miles per gallon of the respective vehicle to be displayed. A corresponding data element in a data structure bound to the user interface of the screen 204 may include a data element labeled "mpg-id" of integer. The user interface framework may include instructions for binding the data element "mpg-id" to the text area wherein the miles per gallon is displayed, such that whenever data with the label "vehicle[0].mpg" is received, the value of the text area depicting the first (i.e., 0th) vehicle mpg is always updated. Data bindings may have types (e.g., arrays), and components may be templated so that the value of data received may be interpolated. The user interface framework may bind different types (e.g., strings, integers, etc.) to graphical representations, so that raw numeric data may be displayed as rich graphics (e.g., maps). Similarly, the data binding may include instructions for modifying the display of particular items. The data binding may include instructions for looping through the list data via a programming loop (e.g., a while loop, for loop, etc.) and inserting data at an appropriate position within the structure of the screen 204, for example, and for formatting the data in a standard display format (e.g., an HTML table).

The user interface framework may include aspects of behavior information and state information as well. For example, the behavior information may include computer instructions that define, for example, which actions to take in response to a key press of a user transmitted to the application by a device such as the device 124. The state may define aspects of the user interface implemented by the user interface framework that may change over time, such as which screen is currently being displayed, which of the filtering capabilities 210 is selected, etc. Although state and behavior are separately defined, they may interact. For example, the behavior implemented in response to a key press may depend on which screen is currently displayed or which button is pressed.

In an embodiment, the method 500 may be performed by a plurality of mobile applications that respectively include, or are generated by, the above-described user interface framework. For example, at block 508, the respective vehicle allocation may be displayed to multiple workers in parallel by rendering the corresponding structure defined by the user interface framework. For example, a respective device of multiple workers may simultaneously evaluate data bindings, wherein the allocation is displayed in a screen of a device of the worker, insert data into the structure of the screen of the respective device, and apply styling to the screen. Rendering the screen may include calling a render function of the user interface framework which outputs complete or partial HTML/JavaScript/CSS files to generate the mobile application.

Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, the term "set" may include a collection of one or more elements.

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer implemented method of facilitating a fleet exchange server to overcome scheduling problems created in a hybrid-use scenario wherein vehicles are used by workers of a company and customers of the company, the method comprising:
   receiving, by one or more processors of the server via an electronic network, a plurality of telematics data sets;
   wherein each of the plurality of telematics data sets corresponds to a respective vehicle in a fleet data set including a plurality of vehicles;
   wherein each telematics data set is generated by a respective mobile computing device configured as a wireless telematics system that receives respective vehicle sensor information in their respective vehicle communication protocols;
   converting, by the one or more processors, each of the telematics data sets' respective communication protocols into a respective standardized telematics data set;
   updating, by the one or more processors, each vehicle in the fleet data set to include the respective standardized telematics data set;
   retrieving, by the one or more processors, the fleet data set;
   retrieving, by the one or more processors, a set of workers each including a respective work calendar, a respective first location, and a respective second location;
   analyzing, by the one or more processors, the fleet data set and the set of workers to generate a vehicle allocation, of at least one vehicle that is not in use by any of the workers, for one of the customers of the company;
   and causing, by the one or more processors, display of the vehicle allocation on a computing device of the one of the customers of the company.

2. The method of claim 1, wherein retrieving the fleet data set includes retrieving vehicles that are currently available for allocation based on the vehicles' respective real-time location.

3. The method of claim 1, wherein retrieving the set of workers each including the respective work calendar, the respective first location, and the respective second location includes selecting the set of workers based on the shift of each respective worker in the set of workers.

4. The method of claim 1, wherein retrieving the set of workers each including the respective work calendar, the respective first location, and the respective second location includes selecting the set of workers based on the geographic proximity of the respective first location of each of the workers in the set of workers.

5. The method of claim 1, wherein analyzing the fleet data set and the set of workers includes generating a vehicle allocation for two workers on different shifts.

6. The method of claim 1, wherein analyzing the fleet data set and the set of workers includes analyzing the job function of each worker in the set of workers.

7. The method of claim 1, wherein analyzing the fleet data set and the set of workers includes generating a vehicle allocation for a worker and the one of the customers.

8. The method of claim 1, wherein analyzing the fleet data set and the set of workers includes using a smart scheduling algorithm to determine an optimal vehicle allocation, wherein the smart scheduling algorithm includes identifying one or both of (i) a location of each respective worker and (ii) a set of date and time needs of each respective worker.

9. A non-transitory computer readable medium containing program instructions for facilitating a computer system to overcome scheduling problems created in a hybrid-use scenario wherein vehicles are used by workers of a company and customers of the company, that when executed by one or more processors of the computer system, cause the computer system to:
   retrieve a fleet data set including a worker information data set, a worker calendar, and a plurality of vehicles, each of the plurality of vehicles including a respective telematics data set generated by a mobile computing device configured as a wireless telematics system that receives vehicle sensor information in a vehicle communication protocol;
   convert each of the telematics data sets' respective communication protocols into a respective corresponding standardized telematics data set;
   generate, based on i) the worker information data set and the worker calendar, and ii) the respective standardized telematics data set, a vehicle allocation, of at least one vehicle that is not in use by any of the workers, for one of the customers of the company; and
   cause display, in a display device of the one of the customers of the company, the vehicle allocation.

10. The non-transitory computer readable medium of claim 9 containing further program instructions that when executed by the one or more processors, cause the computer system to:
    receive an input of a user, via an input device, the input including a request for the vehicle allocation;
    wherein the user is (i) one of the workers or (ii) the one of the customers.

11. The non-transitory computer readable medium of claim 9 containing further program instructions that when executed by the one or more processors, cause the computer system to:
    receive input from the input device, the input including an indication of one or more vehicles in a fleet;
    create, in an electronic database, one or more vehicle records corresponding to the input; and
    display, in an output device of the computing system, an application including a listing of the one or more vehicle records.

12. The non-transitory computer readable medium of claim 9, wherein the program instructions are implemented as a virtual machine instance.

13. A computing system for facilitating fleet exchange to overcome scheduling problems created in a hybrid-use scenario wherein vehicles are used by workers of a company and customers of the company, the computing system comprising:
    one or more processors,
    an electronic network; and a memory including computer executable instructions that, when executed by the one or more processors, cause the computing system to:

retrieve a fleet data set including a plurality of vehicles, each vehicle including a respective corresponding telematics data set generated by a mobile computing device configured as a wireless telematics system that receives vehicle sensor information in a vehicle communication protocol;

convert each of the telematics data sets' respective communication protocols into a respective corresponding standardized telematics data set;

retrieve a set of workers each including a respective work calendar, a respective first location, and a respective second location;

analyze the set of workers and the respective standardized telematics data set to generate a vehicle allocation, of at least one vehicle that is not in use by any of the workers, for one of the customers of the company; and cause a computing device of the one of the customers of the company to display the vehicle allocation.

14. The computing system of claim 13 including further instructions that when executed by the one or more processors, cause the computing system to:

retrieve vehicles that are currently available for allocation based on the vehicles' respective real-time location.

15. The computing system of claim 13 including further instructions that when executed by the one or more processors, cause the computing system to:

select the set of workers based on the shift of each respective worker in the set of workers.

16. The computing system of claim 13 including further instructions that when executed by the one or more processors, cause the computing system to:

select the set of workers based on the geographic proximity of the respective first location of each of the workers in the set of workers.

17. The computing system of claim 13 including further instructions that when executed by the one or more processors, cause the computing system to:

generate a vehicle allocation for two workers on different shifts.

18. The computing system of claim 13 including further instructions that when executed by the one or more processors, cause the computing system to:

analyze the job function of each worker in the set of workers.

19. The computing system of claim 13 including further instructions that when executed by the one or more processors, cause the computing system to:

generate a vehicle allocation for a worker and the one of the customers.

20. The computing system of claim 13 including further instructions that when executed by the one or more processors, cause the computing system to:

use a smart scheduling algorithm to determine an optimal vehicle allocation by identifying one or both of (i) a location of each respective worker, and (ii) a set of date and time needs of each respective worker.

* * * * *